(12) United States Patent
Benson et al.

(10) Patent No.: US 11,873,026 B2
(45) Date of Patent: Jan. 16, 2024

(54) BOGIE FOR A LOWBOY TRAILER (71) Applicant: Fontaine Commercial Trailer, Inc., Springville, AL (US)

(72) Inventors: Gregory C. Benson, Pell City, AL (US); Andrew B. Anderson, Jr., Birmingham, AL (US)

(73) Assignee: Fontaine Commercial Trailer, Inc., Springville, AL (US)

( * ) Notice: Subject to any disclaimer, the term of this patent is extended or adjusted under 35 U.S.C. 154(b) by 381 days.

(21) Appl. No.: 17/165,030

(22) Filed: Feb. 2, 2021

(65) Prior Publication Data

US 2021/0245813 A1   Aug. 12, 2021

Related U.S. Application Data (60) Provisional application No. 62/970,995, filed on Feb. 6, 2020.

(51) Int. Cl.
*B62D 21/20* (2006.01)
*B62D 53/06* (2006.01)

(52) U.S. Cl.
CPC ........... *B62D 21/20* (2013.01); *B62D 53/064* (2013.01)

(58) Field of Classification Search
CPC .... B62D 21/20; B62D 53/061; B62D 53/062; B62D 53/064; B61F 5/00; B61F 5/02; B61F 5/04; B61F 5/26; B61F 5/28; B61F 5/32; B61F 5/50; B61F 5/52
See application file for complete search history.

(56) References Cited

U.S. PATENT DOCUMENTS

| | | | |
|---|---|---|---|
| 4,991,872 A | 2/1991 | Richardson | |
| 7,654,571 B2 | 2/2010 | Gabbianelli et al. | |
| 8,235,421 B2 | 8/2012 | Biscan | |
| 8,573,915 B2 | 11/2013 | Dierks et al. | |
| 9,422,013 B2 | 8/2016 | Graham | |
| 10,202,157 B2 | 2/2019 | Cox | |
| 2012/0248736 A1* | 10/2012 | Dierks | B62D 53/0857 280/425.2 |

(Continued)

FOREIGN PATENT DOCUMENTS

FR        2923793 A1 *  5/2009  ............. B62D 21/04

*Primary Examiner* — Jason D Shanske
*Assistant Examiner* — Daniel M. Keck
(74) *Attorney, Agent, or Firm* — Andrus Intellectual Property Law, LLP (57) ABSTRACT

A bogie for a lowboy trailer includes a pair of longitudinally extending main beams, each having a lower front end configured to be coupled to a lower deck, a higher rear portion configured to carry a suspension system, and a sloped intermediate portion connecting the front end to the rear portion. The bogie also includes multiple transversely extending and longitudinally spaced cross-members connected between the main beams. Each of the cross-members is trough-shaped and has a pair of transversely spaced side sections and a midsection between the side sections, the side sections sloping downwardly toward the midsection such that a top surface of the midsection is lower than respective top surfaces of the main beams. Each side section of at least one cross-member intersects with a respective one of the main beams, such that at least a portion of each side section is located directly below the respective main beam.

20 Claims, 6 Drawing Sheets (56) References Cited

U.S. PATENT DOCUMENTS

| | | | |
|---|---|---|---|
| 2015/0084314 A1* | 3/2015 | Ingels | B62D 21/14 |
| | | | 280/789 |
| 2015/0284027 A1 | 10/2015 | Wang et al. | |
| 2018/0290690 A1 | 10/2018 | Smith et al. | |
| 2019/0210651 A1 | 6/2019 | Svacha et al. | |
| 2021/0179207 A1* | 6/2021 | Hwang | B62D 53/061 |

* cited by examiner

BOGIE FOR A LOWBOY TRAILER

CROSS-REFERENCE TO RELATED APPLICATION

This application claims the benefit of U.S. Provisional Application No. 62/970,995, filed Feb. 6, 2020, which is incorporated by reference herein in its entirety.

FIELD

The present disclosure relates lowboy trailers, and more specifically to bogies for holding suspension systems for lowboy trailers.

BACKGROUND

A lowboy trailer bogie's purpose is to transition from a low-profile deck of the trailer to a structural section that positions the suspension system. The front region of a bogie most often houses yoke-mount suspension arms within its structure to maximize trailer deck length and connects the rearmost section of the trailer deck to a rear suspension support region. The suspension support region positions the suspension hanger brackets and air bag plates and incorporates a platform between the suspension hangers that supports the boom arm of loaded equipment, such as construction machinery. Bolsters are cantilevered beams that extend transversely outward from the rear suspension support region in between the tires. The bolsters provide additional positions for placing loaded equipment and/or act as a path for equipment to drive off of the trailer when unloading onto a dock or elevated surface.

U.S. Pat. No. 4,991,872 discloses an axle suspension assembly for a low-bed trailer wherein the frame is formed of I-beams at each side thereof and each I-beam has an intermediate portion sloping upwardly and rearwardly between a low central portion and a higher rear portion. The customary trailing arm or equalizing beam is pivotally mounted on the web of this sloping portion of the I-beam utilizing a bushing assembly. Basically, the bushing assembly includes two pivot brackets which are bolted to opposite sides of the web and which carry, by way of a resilient bushing a bushing core through which a fastener may pass so as to clamp opposite arms of a yokelike forward portion of the trailing arm to the bushing core. The bushing core passes through an opening formed in the web with the opening being elongated in a fore and aft direction whereby the bushing assembly may be adjusted so as to accurately position the mounted axle transversely of the trailer frame. Each pivot bracket includes a collar and in a preferred embodiment of the bushing, separate bushings are pressed into the collars with the bushings being bonded to separately formed bushing cores.

U.S. Pat. No. 9,422,013 discloses a modular trailer system, wherein a gooseneck, deck, and dolly are attachable to each other in a variety of ways. One configuration allows the gooseneck and dolly to be attached to either end of the deck. Another configuration allows the gooseneck and dolly to be attached directly to each other. This permits the method of transporting a deck to a site, and then returning the gooseneck and dolly to another location.

U.S. Pat. No. 10,780,924 discloses a bogie for a lowboy trailer including a rear suspension support assembly configured to carry a suspension system of the lowboy trailer thereunder and a front transition assembly coupled to a front end of the rear suspension support assembly and configured to couple the rear suspension support assembly to a lower deck of the lowboy trailer. At least a portion of the rear suspension support assembly has a closed cross section when viewed along a longitudinal axis of the rear suspension support assembly. At least a portion of the front transition assembly has a closed cross section when viewed along a longitudinal axis of the front transition assembly.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a bogie for a lowboy trailer includes a pair of longitudinally extending main beams, each main beam having a lower front end configured to be coupled to a lower deck of the lowboy trailer, a higher rear portion configured to carry a suspension system of the lowboy trailer thereunder, and a sloped intermediate portion connecting the front end to the rear portion. The bogie also includes a plurality of transversely extending cross-members connected between the main beams and longitudinally spaced from one another. Each of the cross-members is trough-shaped and has a pair of transversely spaced side sections and a midsection between the side sections, the side sections sloping downwardly toward the midsection such that a top surface of the midsection is lower than respective top surfaces of the main beams. Each side section of at least one cross-member intersects with a respective one of the main beams, such that at least a portion of each side section is located directly below the respective main beam.

According to another example of the present disclosure, a bogie for a lowboy trailer includes a pair of longitudinally extending main beams, each main beam having an upper flange, a lower flange, and a web connecting the upper and lower flanges. The bogie also includes a plurality of transversely extending cross-members connected between the main beams and longitudinally spaced from one another. Each of the cross-members is trough-shaped and has a pair of transversely spaced side sections and a midsection between the side sections, the side sections sloping downwardly toward the midsection. Each side section of at least one cross-member has a notch formed therein that receives the lower flange of a respective one of the main beams, such that at least a portion of each side section is located directly below the respective main beam.

According to yet another example of the present disclosure, a bogie for a lowboy trailer includes a pair of longitudinally extending main beams, each main beam having an upper flange, a lower flange, and a web connecting the upper and lower flanges. The bogie also includes a plurality of transversely extending cross-members comprising a foremost cross-member and a rearmost cross-member, each of the cross-members having an upper flange, a lower flange, and a web connecting the upper and lower flanges. The web of each of the cross-members intersects with each of the main beams such that at least a portion of the web of each of the cross-members is located below the lower flange of each of the main beams. An upper surface of the upper flange of the rearmost cross-member is located above an upper surface of the upper flange of the foremost cross-member.

BRIEF DESCRIPTION OF THE DRAWINGS

The present disclosure is described with reference to the following Figures. The same numbers are used throughout the Figures to reference like features and like components.

FIGS. 2 and 3 illustrate one example of a bogie according to the prior art, wherein

DETAILED DESCRIPTION

Figure 1:
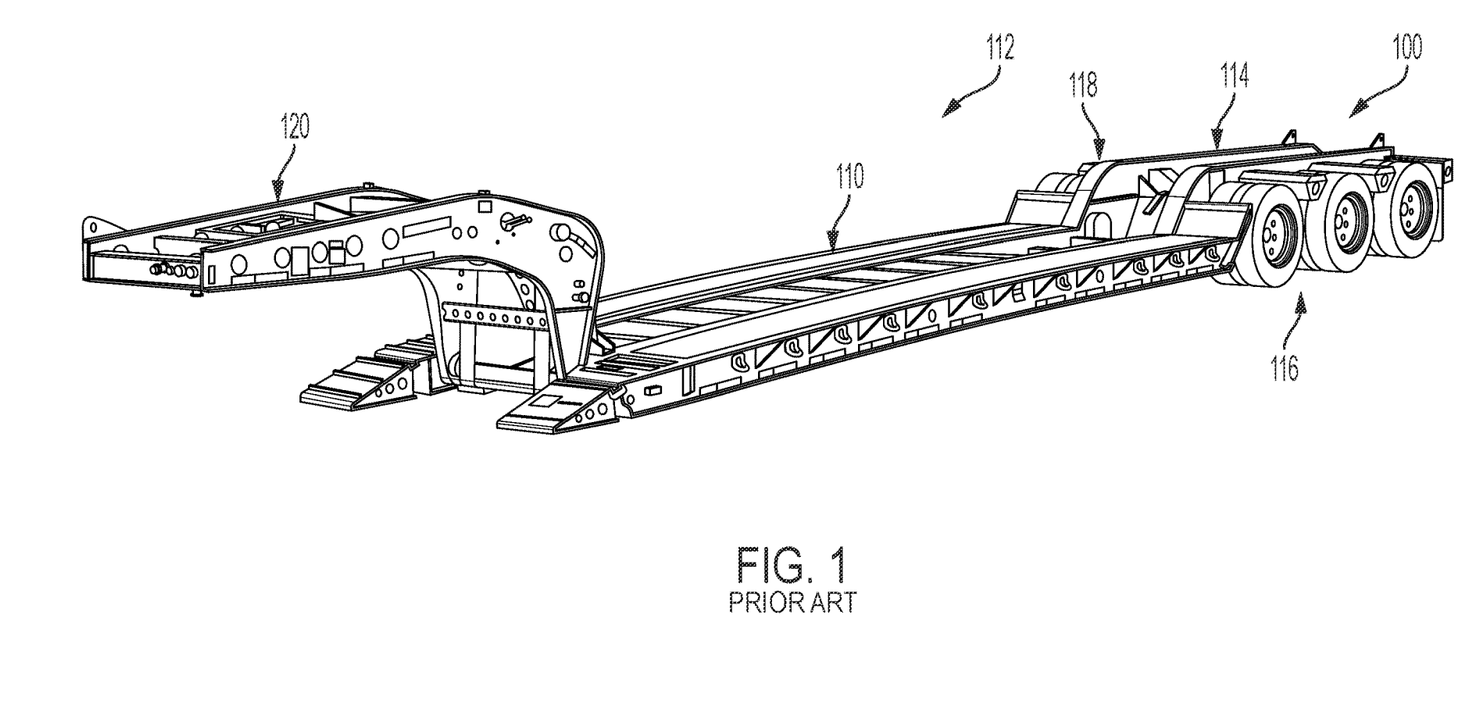
FIG. 1 shows a lowboy trailer equipped with a bogie according to the prior art.
Figure 2:
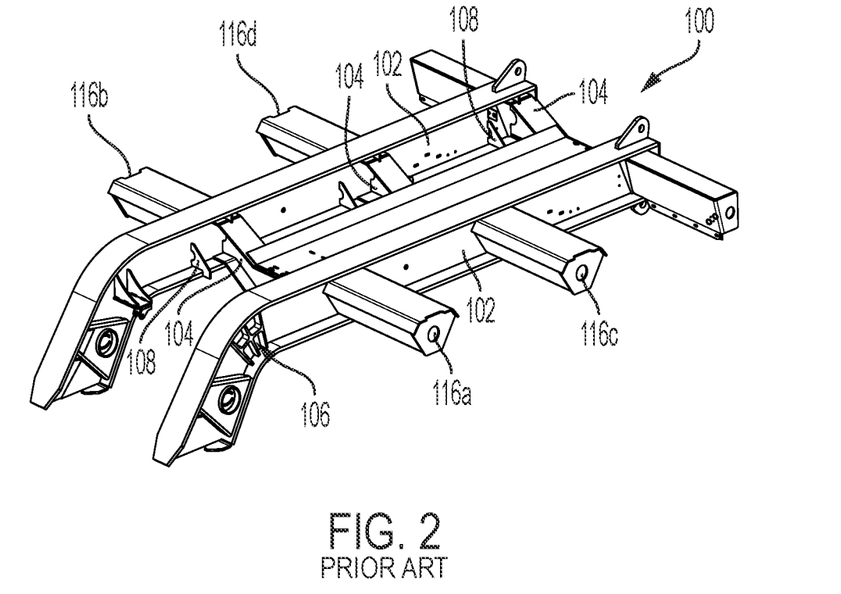
FIG. 2 is a front perspective view thereof.
Figure 3:
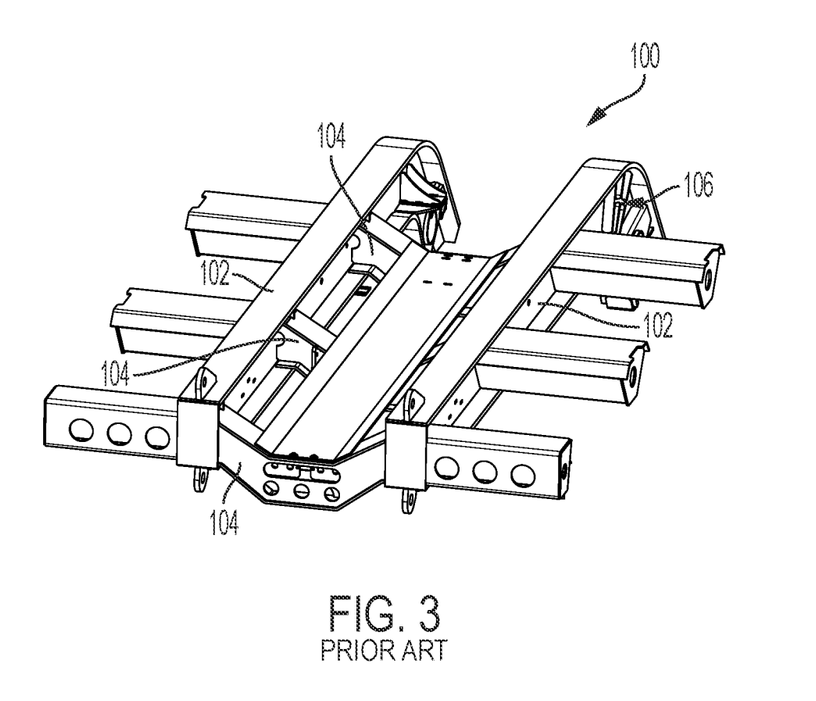
FIG. 3 is a rear perspective view thereof.

Referring to FIG. 1, as noted above, a bogie's purpose is to transition from a low-profile deck 110 of a lowboy trailer 112 to a structural region 114 which positions the suspension system 116 (e.g. tires, air bags, springs, shock absorbers, etc.). In conventional designs, the structural region 114 and a transition region 118 between the deck 110 and the structural region 114 are built with a pair of longitudinal I-beam members, which are held together by transverse I-beam members. For example, FIGS. 2 and 3 show a prior art design for a lowboy bogie 100, which utilizes two longitudinal main beams 102 and multiple cross members 104 in the transverse direction, as well as additional pieces (e.g., piece parts 106, 108) to mount suspension components and add reinforcement.

The transition region 118 is generally exposed to two types of loading: (1) vertical, out of plane loads, which lift the trailer and are a result of rotationally balancing the suspension air bag pressure and the suspension arm's yoke mount about the axle; and (2) internal beam loads, which are a result of trailer loading and external stimulus from road and tire contact. Therefore, expected transition region loading due to inputs includes longitudinal bending, transverse bending, and torsion. Typical loadings for the structural region 114 are similar to those for the transition region 118, with a distinction being made due to the influence from the trailer itself. Because the transition region 118 connects the trailer deck to the structural region 114, its main inputs are a result from linking these two pieces. The structural region 114 naturally loses its internal beam bending moment unless there is a hydraulic spreader or a stinger attached to the trailer. In these latter instances, significant beam bending moments are input into the rearmost section of the bogie 100. An additional global load the bogie 100 experiences is from bolster loading. Because bolsters 116a-d provide additional positions to place loaded equipment or act as a path for equipment to drive off of the trailer 112 if unloading to an elevated surface, as equipment drives over the bolsters 116a-d, the bogie 100 experiences transverse four-point bending.

Figure 4:
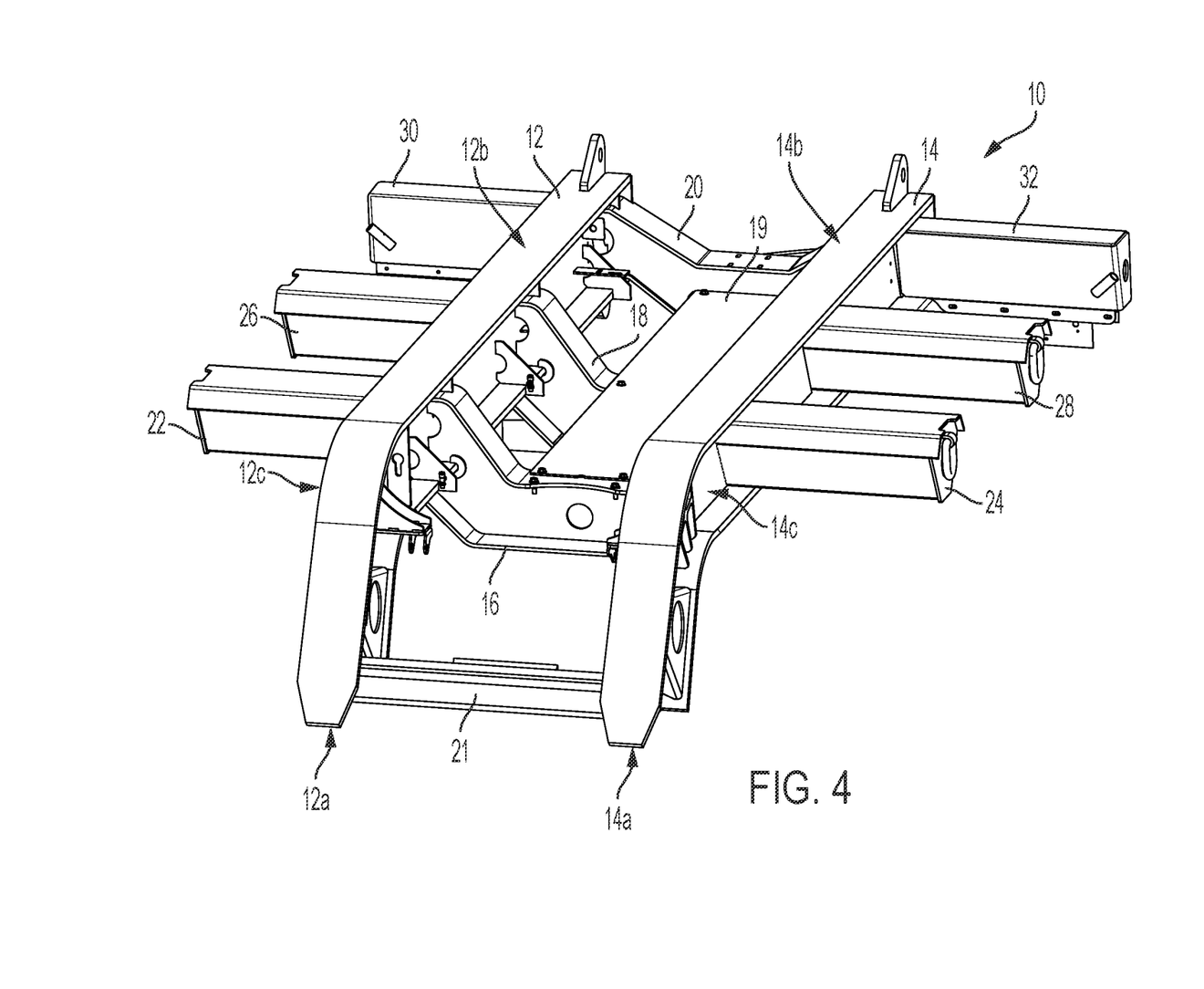
FIG. 4 illustrates a bogie for a lowboy trailer according to the present invention.

FIG. 4 illustrates a bogie 10 for a lowboy trailer according to the present disclosure. The bogie 10 includes a pair of longitudinally extending main beams 12, 14, each main beam 12, 14 having a lower front end 12a, 14a configured to be coupled to a lower deck (see 110, FIG. 1) of the lowboy trailer. Each main beam 12, 14 also has a higher rear portion 12b, 14b configured to carry a suspension system of the lowboy trailer thereunder. In this example, the higher rear portions 12b, 14b are elongated in the longitudinal direction and account for a majority of the length of the bogie 10. Each main beam 12, 14 also has a sloped intermediate portion 12c, 14c connecting the front end 12a, 14a to the rear portion 12b, 14b. The bogie 10 also includes a plurality of transversely extending cross-members 16, 18, 20 connected between the main beams 12, 14 and longitudinally spaced from one another. The cross-members 16, 18, 20 are welded, riveted, or otherwise attached to the main beams 12, 14 in a manner than will be more fully described herein below. A plate 19 is bolted or otherwise fastened to the top of the foremost cross-member 16 and the intermediate cross-member 18 and abuts a front face of the rearmost cross-member 20. A transverse beam 21 is connected between the front ends 12a, 14a of the main beams 12, 14. Each of the above-noted parts may be made of steel.

At least one pair of bolsters (here, first pair of bolsters 22, 24 and second pair of bolsters 26, 28) extends transversely with respect to the bogie 10. Bolsters 22, 26 are cantilevered from main beam 12 and bolsters 24, 28 are cantilevered from main beam 14, such as by welding, riveting, or other known methods. Each bolster in each pair of bolsters is longitudinally aligned with a respective cross-member in the plurality of cross members. Here, bolsters 22, 24 are aligned with cross-member 16, and bolsters 26, 28 are aligned with cross-member 18. As noted herein above, the bolsters 22, 24, 26, 28 are configured to receive loads or act as a path for equipment to drive off of the trailer. The rearmost cross-member 20 is aligned with a pair of light bars 30, 32 extending horizontally outwardly from the main beams 12, 14, respectively. The light bars 30, 32 (sometimes called a rear border) also act as load-supporting members and can receive an equalizer or spreader. Note that the bolsters 22, 24, 26, 28 and light bars 30, 32 could have shapes other than those shown herein, and fewer or more bolsters could be provided.

Figure 5:
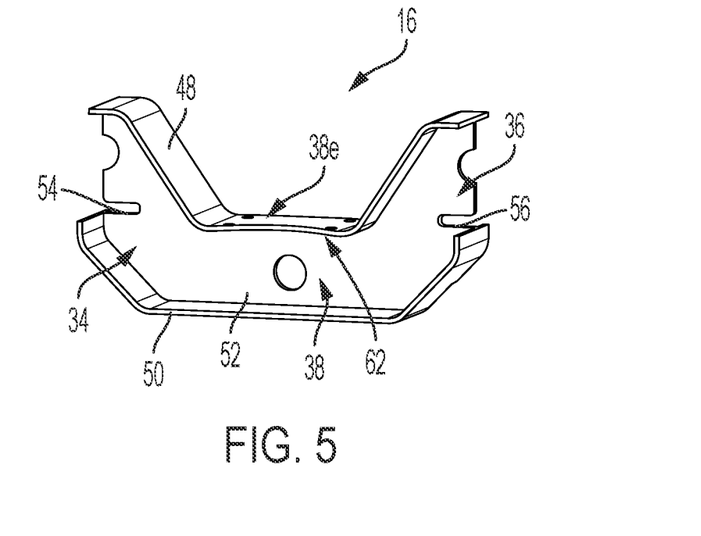
FIG. 5 illustrates one of the cross-members of the bogie in isolation.
Figure 6:
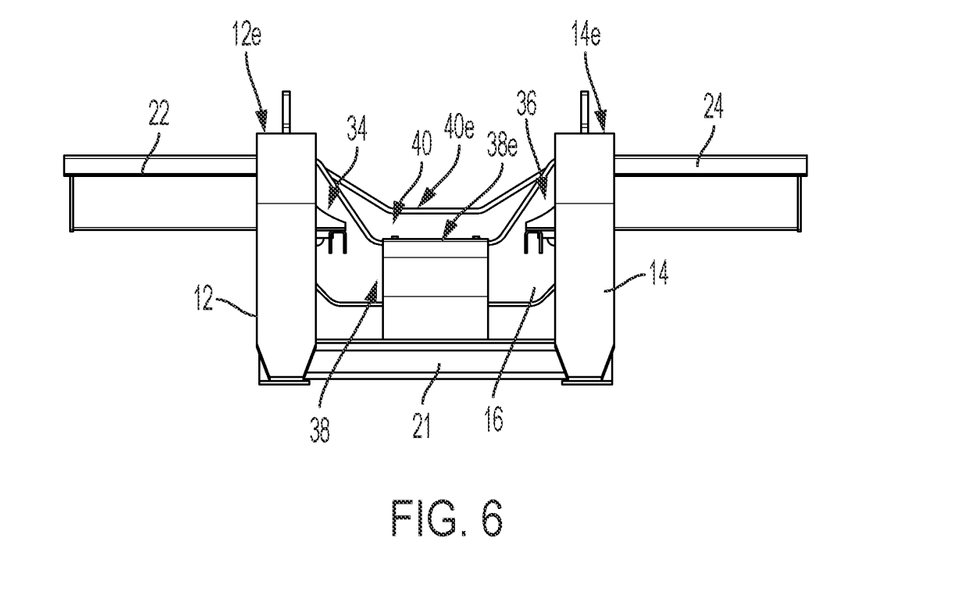
FIG. 6 is a front elevation view of the bogie of the present disclosure.

As shown in FIG. 4, each of the cross-members 16, 18, 20 is trough-shaped, thereby allowing for portions of construction equipment on the trailer to be carried closer to ground elevation. More details of the cross-members are provided with respect to FIG. 5, which shows the foremost cross-member 16 in isolation. Unless specifically noted otherwise, the description of the foremost cross-member 16 applies to the other two cross-members 18, 20 as well. As shown by the cross-member 16 in FIG. 5, each cross-member 16, 18, 20 has a pair of transversely spaced side sections 34, 36 and a midsection 38 between the side sections 34, 36. As also shown in FIG. 6, the side sections 34, 36 slope downwardly toward the midsection 38 such that a top surface 38e of the midsection 38 is lower than respective top surfaces 12e, 14e of the main beams 12, 14. The intermediate cross-member 18 is shaped the same as the foremost cross-member 16 (other than at the upper flange 48, as noted herein below), and its midsection has a top surface that is level with the top surface 38e of the midsection 38 of the foremost cross-member 16. The rearmost cross-member 20 is shaped slightly differently, although still trough-shaped, and its midsection 40 has a top surface 40e that is also lower than the top surfaces 12e, 14e of the main beams 12, 14, but is higher than the top surfaces 38e of the other two cross-members 16, 18.

Figure 7:
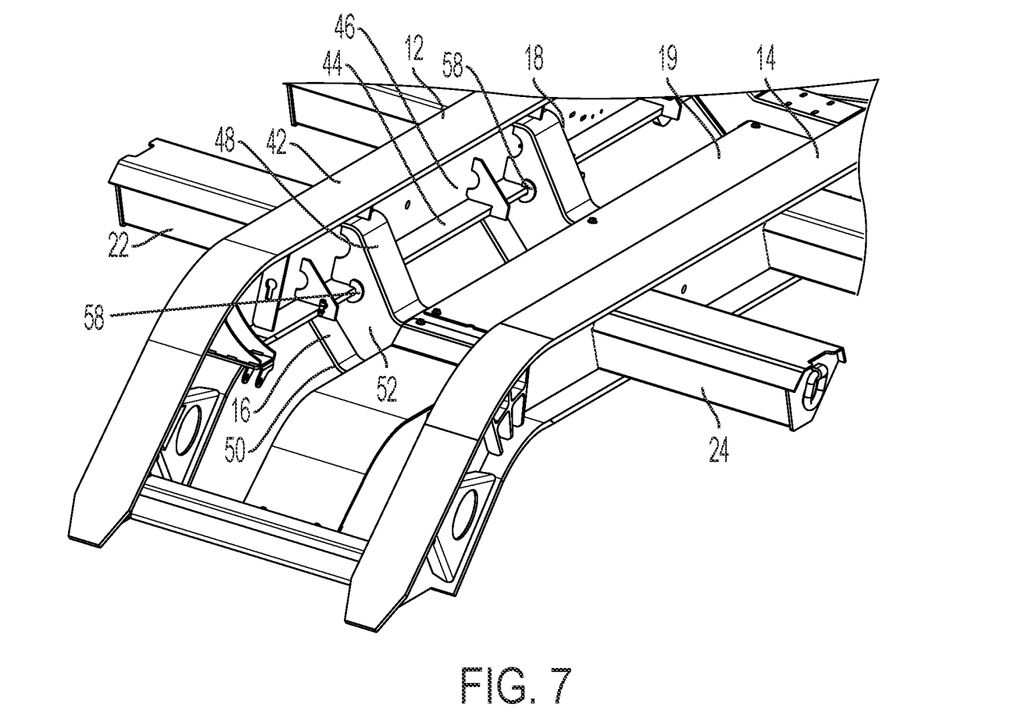
FIG. 7 is a top perspective view of a portion of the bogie, illustrating the longitudinally extending beams and the cross-members.
Figure 8:
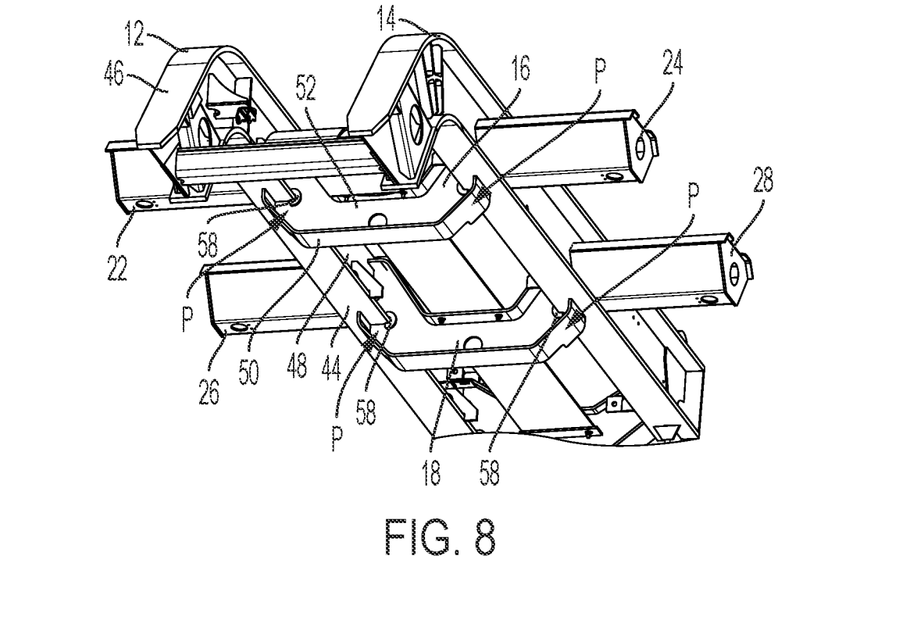
FIG. 8 is a bottom perspective view of a portion of the bogie, illustrating the longitudinally extending beams and the cross-members.

As noted herein above, the trough-shapes of the cross-members 16, 18, 20 allows for construction equipment to be carried closer to ground elevation. As shown in FIGS. 7 and 8, in order to further lower the top surface 38e of the midsections 38 of the two foremost cross-members 16, 18, each side section 34, 36 of the cross-members 16, 18 intersects with a respective one of the main beams 12, 14 such that at least a portion (see "P," FIG. 8) of each side section 34, 36 is located directly below the respective main beam 12, 14. Having such recessed foremost and intermediate cross-members 16, 18 moves the interference line typically created between a boom arm of loaded construction equipment and a prior art foremost cross member down, allowing equipment with boom arms to be positioned lower when in transport. In turn, this allows different (perhaps shorter) routes to be taken on roadways with height restrictions, saving time and money transporting construction equipment.

Referring still to FIGS. 7 and 8, the main beams 12, 14 and cross-members 16, 18, 20 are structural members having cross-sections designed to withstand the above-described loads on the bogie 10. More specifically, each main beam 12, 14 has an I-shaped cross section. Although only the main beam 12 will be described, the same description applies to the main beam 14, which is a mirror image. The main beam 12 has an upper flange 42, a lower flange 44, and a web 46 connecting the upper and lower flanges 42, 44. Similarly, each cross-member 16, 18, 20 also has an I-shaped cross section. Again, although only the foremost cross-member 16 will be described, the same description applies to the cross-member 18, which is identical except for the upper flange 48, and to the rearmost cross-member 20, which has generally the same structural parts. The cross-member 16 has an upper flange 48, a lower flange 50, and a web 52 connecting the upper and lower flanges 48, 50. The flanges 42, 44 and web 46 and the flanges 48, 50 and web 52 of the structural members are specifically designed (by selection of type of steel, size, and shape) to provide the required strength for withstanding the above-noted loads. Although I-beams are shown herein, other structural sections could be used, such as box beams.

In order to lower the elevation of the top surfaces 38e of the midsections 38 of the cross-members 16, 18, at each side section 34, 36 of the foremost cross-member 16 and the intermediate cross-member 18, the web 52 intersects the lower flange 44 of each respective main beam 12, 14. Referring also to FIG. 5, to facilitate such intersection, at each side section 34, 36, the web 52 has a notch 54, 56 formed therein, each notch 54, 56 being configured to receive the lower flange 44 of each respective main beam 12, 14. The web 52 can be made of a sheet of steel that is cut (such as plasma cut, oxyfuel cut, or lasercut) to create its overall shape and/or the notches 54, 56 therein. The upper and lower flanges 48, 50 can be roll-formed and then welded, riveted, or otherwise attached to the web 52. Other manufacturing methods are possible besides those described herein, which are provided for exemplary purposes only.

After the lower flanges 44 of the main beams 12, 14 are inserted in the notches 54, 56 of the cross-members 16, 18, reinforcing pieces 58 may be connected to front and back faces of the web 52 of the cross-members 16, 18 immediately adjacent each notch 54, 56. The reinforcing pieces 58 may be welded, riveted, or otherwise attached to the web 52. The reinforcing pieces 58 strengthen the connection at the notches 54, 56, which might otherwise reduce the structural strength of the cross-members 16, 18.

Figure 9:
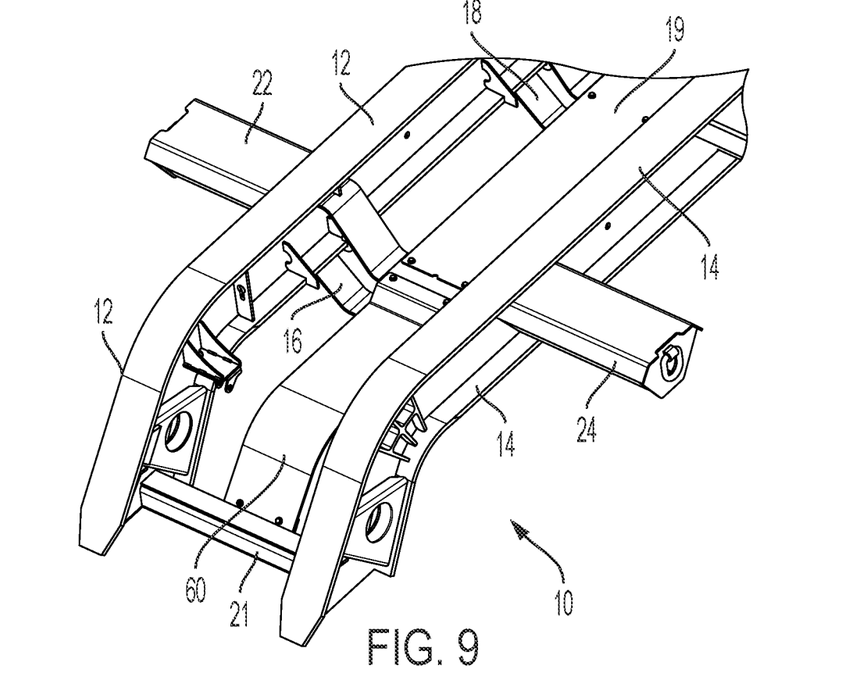
FIG. 9 is a top perspective view of a portion of the bogie, illustrating a transverse beam connected between the front ends of the longitudinally extending beams.

FIG. 9 shows another view of the bogie 10, in which a curved plate 60 is provided between the foremost cross-member 16 and the transverse beam 21 connected between the front ends 12a, 14a of the main beams 12, 14. The curved plate 60 is bolted or otherwise fastened at its rear and front ends to the foremost cross-member 16 and the transverse beam 21, respectively. Similar to the plate 19, the curved plate 60 can be used to support parts of the construction machinery. Note that the transverse beam 21 has a different cross-sectional shape than that of the plurality of cross-members 16, 18, 20. This is because, rather than acting as a structural member to support loads on the bolsters 22, 24, 26, 28, the transverse beam 21 can be used to support a portion of the construction machinery, such as the boom, and transfer the load from the boom to the bogie's hydraulics. In the present example, the transverse beam 21 has a triangular cross-section, but other structural cross-sections could be used.

Figure 10:
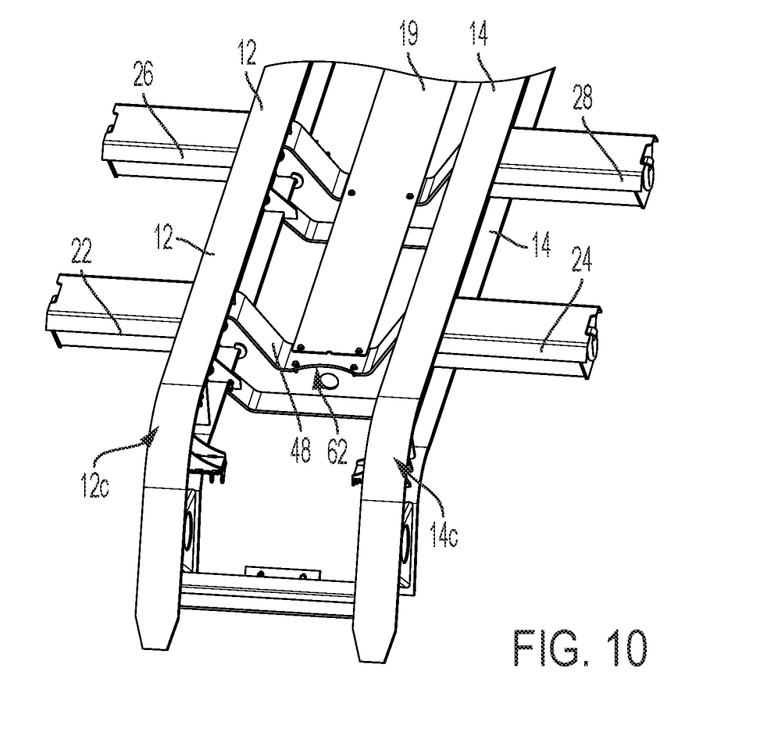
FIG. 10 is a top perspective view of a portion of the bogie, with a front plate removed to illustrate the flange on one of the cross-members.

In contrast to FIG. 9, in FIG. 10, the curved plate 60 has been removed. It can be seen that the foremost cross-member 16 that is connected behind and adjacent to the intermediate portions 12c, 14c of the main beams 12, 14 has a front portion of its upper flange 48 removed at its midsection 38. Thus, the upper flange 48 includes an arc-shaped cutout region as shown at 62. This moves the front surface of the upper flange 48 back slightly to allow for the boom on construction machinery to be lowered even more, thus reducing the overall height of the trailer plus load. If the extra height reduction is not needed in a particular application, the curved plate 60 can be re-installed.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other assemblies. It is to be expected that various equivalents, alternatives and modifications are possible within the scope of the appended claims.

What is claimed is:

1. A bogie for a lowboy trailer, the bogie comprising:
  a pair of longitudinally extending main beams, each main beam having a lower front end, a higher rear portion, and a sloped intermediate portion connecting the front end to the rear portion; and
  a plurality of transversely extending cross-members connected between the main beams and longitudinally spaced from one another;
  wherein each of the cross-members is trough-shaped and has a pair of transversely spaced side sections and a midsection between the side sections, the side sections sloping downwardly toward the midsection such that a top surface of the midsection is lower than respective top surfaces of the main beams; and
  wherein each side section of at least one cross-member intersects with a respective one of the main beams, such that at least part of the downwardly sloping portion of each side section is located directly below the respective main beam.

2. The bogie of claim 1, wherein each main beam has an I-shaped cross section with an upper flange, a lower flange, and a web connecting the upper and lower flanges.

3. The bogie of claim 2, wherein each cross-member has an I-shaped cross section with an upper flange, a lower flange, and a web connecting the upper and lower flanges.

4. The bogie of claim 3, further comprising a transverse beam connected between the front ends of the main beams and having a different cross-sectional shape than that of the plurality of cross-members.

5. The bogie of claim 3, wherein a foremost cross-member that is connected behind and adjacent to the intermediate portions of the main beams has a front portion of its upper flange removed at its midsection.

6. The bogie of claim 5, wherein at each side section, the web of the foremost cross-member intersects the lower flange of each respective main beam.

7. The bogie of claim 6, wherein at each side section, the web of the foremost cross-member has a notch formed therein, each notch configured to receive the lower flange of each respective main beam.

8. The bogie of claim 7, further comprising reinforcing pieces connected to front and back faces of the web of the foremost cross-member immediately adjacent each notch.

9. The bogie of claim 1, further comprising at least one pair of bolsters extending transversely with respect to the bogie and cantilevered from the main beams.

10. The bogie of claim 9, wherein each bolster in the at least one pair of bolsters is aligned with a respective cross-member in the plurality of cross members.

11. A bogie for a lowboy trailer, the bogie comprising:
a pair of longitudinally extending main beams, each main beam having an upper flange, a lower flange, and a web connecting the upper and lower flanges; and
a plurality of transversely extending cross-members connected between the main beams and longitudinally spaced from one another;
wherein each of the cross-members is trough-shaped and has a pair of transversely spaced side sections and a midsection between the side sections, the side sections sloping downwardly toward the midsection; and
wherein each side section of at least one cross-member has a notch formed therein that receives the lower flange of a respective one of the main beams, such that at least part of the downwardly sloping portion of each side section is located directly below the respective main beam.

12. The bogie of claim 11, wherein each cross-member has an I-shaped cross section with an upper flange, a lower flange, and a web connecting the upper and lower flanges.

13. The bogie of claim 12, further comprising reinforcing pieces connected to front and back faces of the web of the cross-member immediately adjacent each notch.

14. The bogie of claim 12, wherein the plurality of cross-members comprises a foremost cross-member, an intermediate cross-member, and a rearmost cross-member.

15. The bogie of claim 14, wherein an upper surface of the upper flange of the foremost cross-member is coplanar with an upper surface of the upper flange of the intermediate cross-member.

16. The bogie of claim 15, wherein an upper surface of the upper flange of the rearmost cross-member is located above the upper surfaces of the upper flanges of the foremost cross-member and the intermediate cross-member.

17. The bogie of claim 16, further comprising a plate coupled to the upper surfaces of the upper flanges of the foremost cross-member and the intermediate cross-member and abutted to a front face of the rearmost cross-member.

18. A bogie for a lowboy trailer, the bogie comprising:
a pair of longitudinally extending main beams, each main beam having an upper flange, a lower flange, and a web connecting the upper and lower flanges; and
a plurality of transversely extending cross-members comprising a foremost cross-member and a rearmost cross-member, each of the cross-members having an I-shaped cross section with an upper flange, a lower flange, and a web connecting the upper and lower flanges;
wherein each of the cross-members is trough-shaped and the web of at least one of the cross-members intersects with each of the main beams such that at least a portion of the web of at least one of the cross-members is located below the lower flange of each of the main beams; and
wherein an upper surface of the upper flange of the rearmost cross-member is located above an upper surface of the upper flange of the foremost cross-member.

19. The bogie of claim 18, wherein the plurality of cross-members further comprises an intermediate cross-member, and wherein a lower surface of the lower flange of the intermediate cross-member terminates against a lower surface of the lower flange of each of the main beams.

20. The bogie of claim 19, wherein the upper surface of the upper flange of the foremost cross-member is coplanar with an upper surface of the upper flange of the intermediate cross-member.

* * * * *